(12) United States Patent
Gethmann

(10) Patent No.: US 7,472,716 B2
(45) Date of Patent: Jan. 6, 2009

(54) VALVE PACKING REMOVAL DEVICE

(75) Inventor: Douglas P. Gethmann, Gladbrook, IA (US)

(73) Assignee: Fisher Controls International LLC, St. Louis, MO (US)

( * ) Notice: Subject to any disclaimer, the term of this patent is extended or adjusted under 35 U.S.C. 154(b) by 137 days.

(21) Appl. No.: 11/671,808

(22) Filed: Feb. 6, 2007

(65) Prior Publication Data

US 2007/0200079 A1 Aug. 30, 2007

Related U.S. Application Data

(62) Division of application No. 10/628,717, filed on Jul. 28, 2003, now Pat. No. 7,172,172.

(51) Int. Cl.
*F16K 31/44* (2006.01)

(52) U.S. Cl. .............................. 137/15.18; 137/315.28; 137/327; 277/511; 81/8.1

(58) Field of Classification Search ............ 137/315.27, 137/315.28, 327, 15.18; 251/214, 174; 81/8.1; 277/511
See application file for complete search history.

(56) References Cited

U.S. PATENT DOCUMENTS

| 3,149,514 | A | * | 9/1964 | Shaub .......................... 81/8.1 |
| 3,262,673 | A | | 7/1966 | Seeley |
| 3,412,972 | A | | 11/1968 | Williams et al. |
| 4,087,075 | A | | 5/1978 | Nechanicky |
| 4,270,730 | A | | 6/1981 | Hinrichs |
| 4,272,055 | A | | 6/1981 | Herd |
| 4,541,612 | A | | 9/1985 | Yohner |
| 4,745,938 | A | | 5/1988 | Nimberger et al. |
| 4,773,442 | A | | 9/1988 | Lephilibert |
| 4,964,432 | A | | 10/1990 | Chou |
| 5,058,861 | A | | 10/1991 | Baumann |
| 5,107,882 | A | * | 4/1992 | Carroll .......................... 137/327 |
| 5,253,405 | A | * | 10/1993 | Carroll .......................... 29/264 |
| 5,375,484 | A | * | 12/1994 | Castelletti ...................... 81/8.1 |
| 5,408,901 | A | * | 4/1995 | Bishop .......................... 81/8.1 |
| 5,788,216 | A | | 8/1998 | Pittman et al. |
| 5,799,928 | A | | 9/1998 | Siver |
| 6,032,554 | A | * | 3/2000 | Durant .......................... 29/264 |
| 6,062,539 | A | | 5/2000 | Kawabe et al. |
| 6,095,493 | A | | 8/2000 | Velan |
| 6,116,573 | A | | 9/2000 | Cornette et al. |
| 6,250,604 | B1 | | 6/2001 | Robert |
| 6,886,805 | B2 | | 5/2005 | McCarty |

* cited by examiner

*Primary Examiner*—Kevin L Lee
(74) *Attorney, Agent, or Firm*—Marshall, Gerstein & Borun LLP

(57) ABSTRACT

A valve having a valve packing removal device attached thereto is disclosed. The valve may include a valve plug reciprocally disposed within the valve housing and connected to a sliding stem. The packing may be provided about the valve stem to ensure or minimize leakage of regulated fluid from the valve. A sleeve may have a diameter less than a bore in which the packing is disposed and may be connected to the valve stem such that when the valve stem is sufficiently pulled from the valve, the sleeve engages the packing and pulls the packing from the valve.

12 Claims, 2 Drawing Sheets

VALVE PACKING REMOVAL DEVICE

This application is a divisional of Ser. No. 10/628,717, filed Jul. 28, 2003, now U.S. Pat. No. 7,172,172.

FIELD OF THE DISCLOSURE

The present disclosure generally relates to valves and, more particularly, relates to valve packing.

BACKGROUND OF THE DISCLOSURE

Valves are commonly used to control the flow characteristics of a fluid. A conventional valve includes a valve body defining an inlet, an outlet, and a fluid flow path extending between the inlet and the outlet. A throttling element, such as a valve plug, is disposed in the path to control fluid flow. A stem connects the valve plug to an actuator, which moves the valve plug into and out of the flow path. The valve plug can be positioned between fully opened and fully closed positions to control the flow rate of the fluid through the control valve.

In such devices, a stem or other element is connected to the control element and extends from the valve body. The stem or other element is then connected to a typical actuator such as a spring and diaphragm actuator for movement of the stem, and thus the control element. The actuator typically receives control signals which dictate when the actuator moves the stem, as well as how much the stem is moved. While effective, the fact that an element extends from the housing allows for a passageway to exist between the fluid being regulated through the valve and the outside of the valve housing. It is therefore necessary to tightly seal the element against such leakage. This is particularly true when leakage of the fluid flowing through the valve presents a safety hazard or loss of the fluid is otherwise undesirable.

Accordingly, seals, typically referred to as packing, are integrated into the control valve to seal about the movable element or valve stem. In the case of a sliding stem valve, such packing is typically assembled from a stack of disks or washers. The packing is placed under constant load about the stem by a packing spring and packing flange with the packing flange being secured to the valve by fasteners or bolts. The packing spring supplies a constant spring force to load the packing, placing it in contact with the valve stem and thereby forming a fluid seal. The packing is generally comprised of an elastomer, graphite, or a combination of both. Continual operation of the valve causes degradation of the packing and an eventual failure of the fluid seal. It is therefore necessary to periodically change the packing to maintain the seal.

Certain difficulties however are encountered when removing the packing from such a sliding stem valve. The cylindrical opening around the valve stem is typically referred to as a packing box, and after prolonged usage, the packing provided within the packing box, particularly when used in a corrosive environment, becomes essentially a blind hold requiring the packing to be dug or otherwise physically extricated from the packing box. This in turn can cause damage to the stem or the packing box bore which will result either in less than an optimal seal being created when the new packing is inserted, or will require additional machining to make sure that the stem and packing box are of correct dimension and tolerance after removal. Alternatively, special tools can be designed for removing the packing, but again damage to the stem and bore can occur, and such special tools necessarily result in an added expense in maintaining the valve.

SUMMARY OF THE DISCLOSURE

In accordance with one aspect of the disclosure, a valve packing removal device is disclosed which comprises a substantially cylindrical housing adapted to be secured to valve stem of a sliding stem valve. The substantially cylindrical housing includes an outer surface, an inner surface, and a hollow interior The outer surface includes a diameter less than the diameter of the packing box of the valve with the inner surface having a diameter larger than the diameter of the valve stem.

In accordance with another aspect of the disclosure, a valve is disclosed which comprises a valve housing, a valve plug, a packing box, packing, and a sleeve. The valve housing includes an inlet, an outlet, and a cage therebetween with the valve stem being slidably mounted in the housing. The valve plug is connected to the valve stem and is movable within the cage. The packing box is provided in the valve housing around the valve stem. The packing is disposed in the packing box around the sliding stem and a sleeve is mounted to the valve stem proximate the valve plug. The sleeve includes an external diameter less than the internal diameter of the packing box.

In accordance with another aspect of the disclosure, a method of removing packing from a valve using the valve trim is disclosed. The valve trim includes at least the valve stem and the valve plug. The packing is removed by securing a sleeve to a valve stem of the valve, relieving pressure from packing surrounding the valve stem, and pulling the valve trim through the valve. By pulling the valve trim and sleeve through the valve, the valve packing is removed.

These and other aspects and features of the disclosure will become more readily apparent after reading the following detailed description when taken into conjunction with the accompanying drawings.

Figure 1:
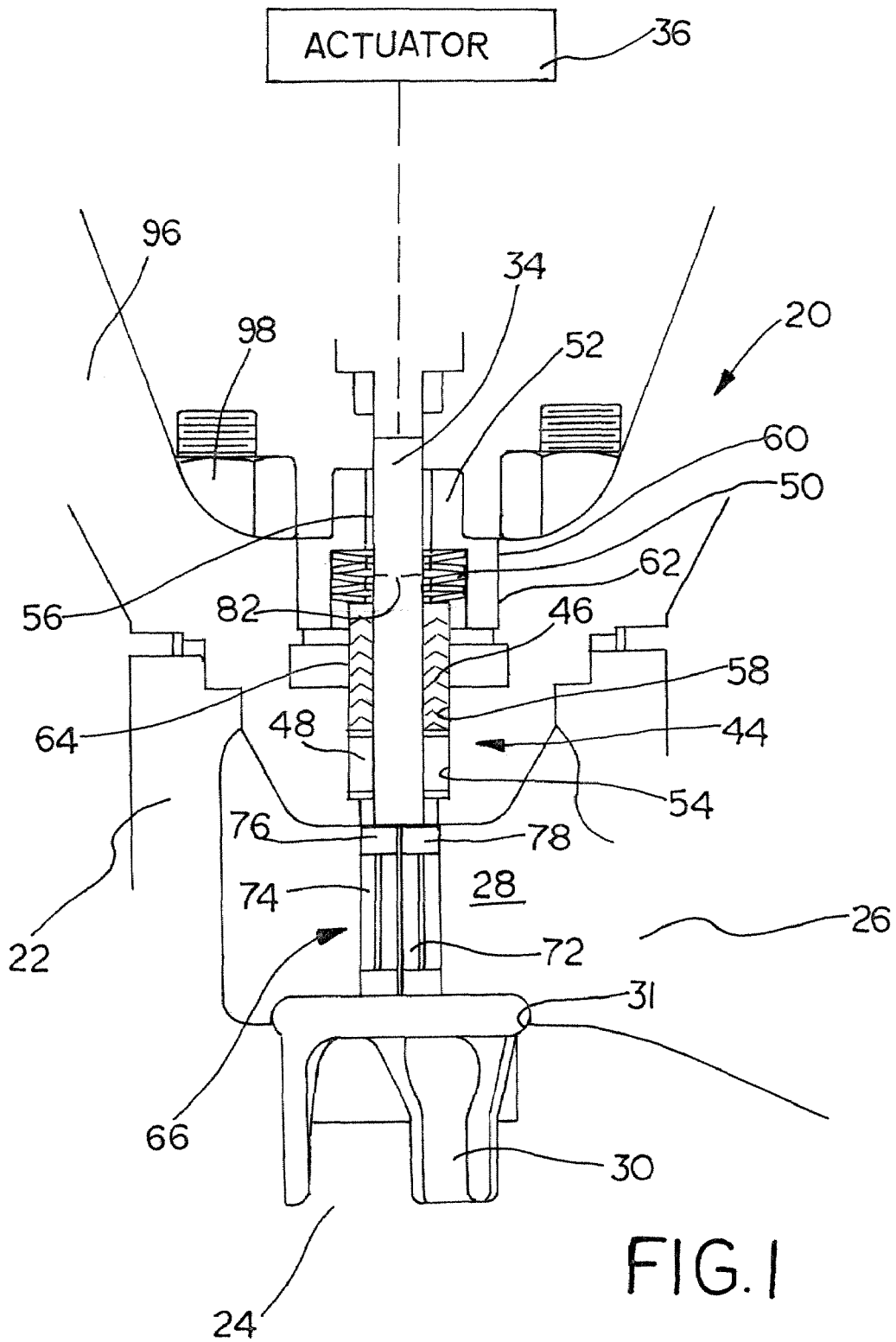
FIG. 1 is a sectional view of a valve constructed in accordance with the teachings of the disclosure.
Figure 2:
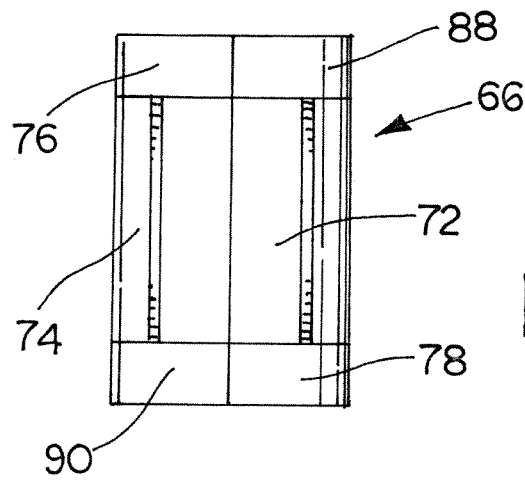
FIG. 2 is a front view of a valve packing removal device constructed in accordance with the teachings of the disclosure.
Figure 3:
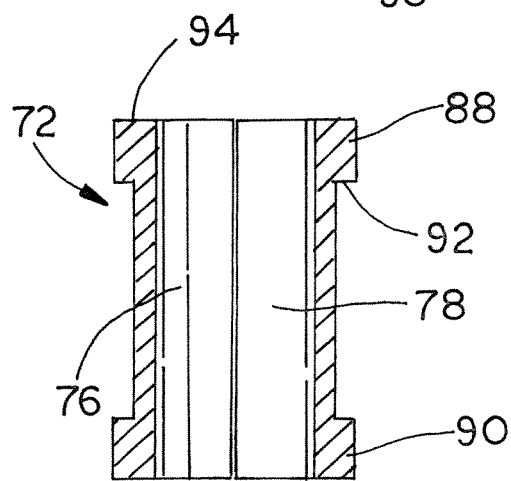
FIG. 3 is a sectional view of a sleeve of the valve packing removal device of FIG. 2.
Figure 4:
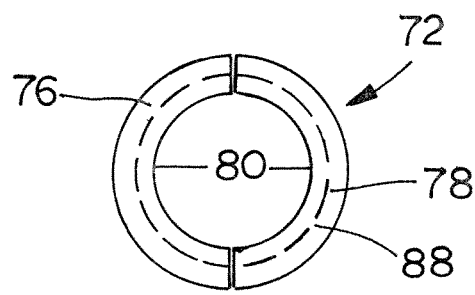
FIG. 4 is an end view of the sleeve of FIG. 3.
Figure 5:
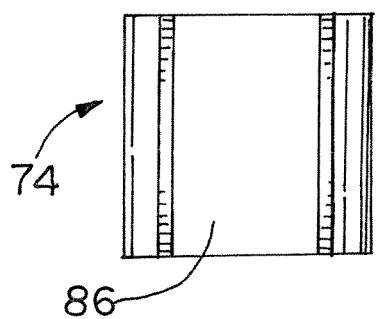
FIG. 5 is a front view of a snap lock forming a part of the valve packing removal device.
Figure 6:
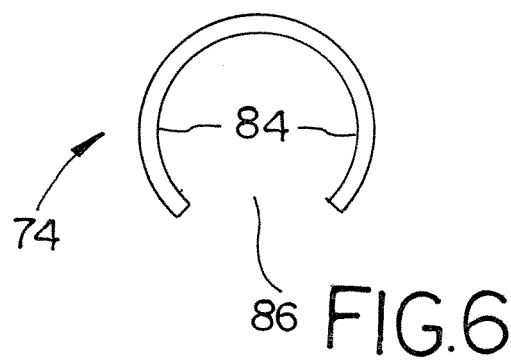
FIG. 6 is an end view of the snap lock of FIG. 5.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the present disclosure as defined by the appended claims.

DETAILED DESCRIPTION OF THE DISCLOSURE

Referring now to the drawings, and with specific reference to FIG. 1, a valve constructed in accordance with the teachings of the disclosure is generally referred to by reference numeral 20. While the disclosure will describe and the drawings will depict a sliding stem valve, it should be understood that the teachings of the disclosure can be used in conjunction with any other type of valve, as well as any other structure wherein packing or other form of seal is provided which must be periodically removed without damaging the device into which the packing is installed.

Referring again to FIG. 1, the valve 20 is shown to include a housing 22 having an inlet 24, an outlet 26, and a valve chamber 28 therebetween. The valve 20 can be used to regulate the flow of a fluid (not shown) between the inlet 24 and the outlet 26 by controlling the location of a valve element such as, but not limited to, a valve plug 30 relative to a valve seat 31 In the depicted embodiment, the valve plug 30 is slidably positioned within the chamber 28 so as to be movable relative to the valve seat 31. A valve stem 34 is connected to the valve plug 30 and is used to move the valve plug 30 to any desirable position so as to regulate the flow of fluid through the valve 20. This may be done by connecting the valve stem 34 to an actuator 36. As known to those skilled in the art, any number of different types of valve actuators 36 can be employed, with the actuator 36 depicted using pressurized fluid such as compressed air to fill a chamber (not shown) to different pressures and therefore cause a diaphragm or the like to move along a longitudinal axis defined by the valve stem 34. Accordingly, as the diaphragm moves up or down, the valve stem 34, which is connected thereto, moves up or down, thus causing the valve plug 30 to move up and down within the chamber 28.

As also shown in FIG. 1, the valve 20 is provided with a seal assembly 44. The seal assembly 44 is used to ensure that the fluid being regulated by valve 20 only passes between the inlet 24 and the outlet 26 and is not able to escape from the valve 20 along the valve stem 34. The sealing assembly 44 may include packing 46, a packing follower 48, a spring 50, and an end cap 52 housed within a packing box or bore 54. As known to those skilled in the art, the packing 46 is generally manufactured from an elastomeric material such as tetrafluoroethylene (TFE) or can be manufactured from high temperature graphite and is sized so as to frictionally engage an outer surface 56 of the valve stem 34. The end cap 52 includes a plurality of external threads 60 adapted to interfit with a plurality of internal threads 62 provided on the valve housing 22. Accordingly, the end cap 52 can be screwed onto the housing 22 and, in turn, downwardly compress the spring 50, and the packing 46. By compressing the packing 46 longitudinally along the valve stem 34 it will forcefully engage not only the outer surface 56 of the valve stem 34, but also an inner surface 58 of the packing box 54, thereby substantially sealing the packing box 54 to thus prevent escape of any fluid from the valve 20.

As shown best in FIG. 1, when it is desired to remove the valve packing 46, a valve packing removal device 66 may be mounted to the valve stem 34 provided between the valve plug 30 and the packing follower 48. The valve packing removal device 66 is substantially cylindrical in shape and is provided with an outer diameter less than an inner diameter of the packing box 54, the importance of which will be discussed in further detail herein. Accordingly, when the valve stem 34 is slid upwardly (with respect to the orientation provided in FIG. 1) the valve packing removal device 66 pushes the valve seal assembly 44 upwardly as well and ultimately out of the packing box 54 for easy removal by maintenance personnel.

Referring now to FIG. 2-6, the valve packing removal device 66 is shown in more detail. As will be readily apparent from the figures, the valve packing removal device 66 may include a sleeve 72 as well as a snap lock or lock ring 74. The sleeve 72 may include first and second halves 76 and 78 which are substantially semi-cylindrical in shape and which define an inner diameter 80 corresponding to an outer diameter 82 of the valve stem 34. Accordingly, the sleeve 72 can be frictionally attached to the valve stem 34 if sufficient force is provided so as to grip the first and second halves 76 and 78 thereon. Such force may be provided by the lock ring 74, which is shown best in FIGS. 5 and 6 as substantially C-shaped in lateral cross section. As known to those skilled in the art, the locking ring 74 includes an inner diameter 84 which is sufficiently small to create a spring force that binds the first and second halves 76 and 78 radially inwardly, thus gripping the valve stem 34. The lock ring 74 includes a longitudinal gap 86 to allow for an introduction of the valve stem 34 therethrough. The sleeve 72, and more specifically the first and second halves 76 and 78, may include upper and lower shoulders 88 and 90 to define a recess 92 for receipt of the lock ring 74 in a stable fashion. In addition, the upper shoulder 88 provides a surface 94 to engage the valve seal assembly 44, and push the valve seal assembly 44 out of the packing box 54.

From the foregoing, it will be readily understood that the teachings of the disclosure can be used to manufacture a valve 20 having a mechanism by which the packing 46 of the valve 20 can be easily removed. More specifically, in normal operation, the end cap 52 is threadably secured to the valve housing 22 using threads 60, 62. This, in turn, causes the spring 50 to compress, thereby providing a compressive force against the elastomeric packing 46 and sealing the packing 46 both against the valve stem 34 and the packing box 54.

However, when it is desired to remove the packing 46, as after a predetermined replacement schedule or when a leak is detected, the valve packing removal device 66 may be connected to the valve stem 34. Given the clam shell design referenced above, this may be done in any number of ways, including in situ installation wherein a maintenance worker reaches through the valve chamber 28, mounts the halves 76, 78 around the stem 34, and secures the sleeve 72 using the lock ring 74. More commonly, the maintenance worker would disengage the entire bonnet assembly 96 from the valve 22 by removing nuts 98 to thereby extract the valve plug 30 from the valve 20. In so doing, the valve stem 34 is completely exposed and the sleeve 72 can be easily installed as indicated above.

Once the valve packing removal device 66 is attached, end cap 52 can be threadably removed, thus decompressing the spring 50 and in turn decompressing the packing 46. The stem 34 can then be pulled upward through the packing box 54, thereby causing the sleeve 72 to push the valve seal assembly 44 from the packing box 54. More specifically, the valve stem 34 can be manually pulled from the valve 20, or the force available through the valve actuator 36 can be used to pull the valve stem 34 upwardly, thus causing the valve packing removal device 66 to engage the valve seal assembly 44 and push the valve seal assembly 44 from the packing box 54. The upper surface 94 of the sleeve 72 may be provided with a diameter slightly less than that of the packing box 54 to ensure that the entire valve seal assembly 44 is pulled or plowed out of the packing box 54.

As opposed to conventional valves, with the disclosed valve 20, the packing 46 need not be pried, dug, or otherwise mechanically removed from the packing box 54. This is beneficial as such action can easily cause damage to the valve stem 34 or packing box 54.

The foregoing detailed description has been given for clearness of understanding only, and no unnecessary limitations should be understood therefrom, as modifications will be obvious to those skilled in the art. For example, it can be appreciated by those skilled in the art that the present valve packing removal device is not limited to sliding stem control valves, but may be attached to any valve stem, including a rotary valve stem, to facilitate removal upon extraction of the valve stem. Moreover, the cylindrical clam shell and locking ring design need not be used to practice the disclosed invention. Any structure which can be mounted to the valve stem with sufficient surface area to engage the packing may be employed. This could include one piece embodiments with deflectable arms adapted to move around the valve stem during mounting and then grip the valve stem, embodiments having polygonal shapes or lesser dimension in lateral cross section, and clam shell designs using fasteners or the like as opposed to clamping rings.

What is claimed is:

1. A method of removing packing from a valve, comprising:
    securing a sleeve to a valve stem of the valve, a valve plug being secured to the valve stem;
    relieving pressure from packing surrounding the valve stem; and
    pulling the valve stem and sleeve from the valve, the sleeve pulling the valve packing out of the valve.

2. The method of claim 1, wherein the sleeve is a two piece construction, and is secured to the valve stern using at least one fastener.

3. The method of claim 2, wherein the fastener is a snap ring.

4. The method of claim 1, wherein the packing is compressed around the valve stem by a spring and an end cap secured to the valve, the pressure being relieved by removing the end cap and allowing the spring to decompress.

5. The method of claim 1, wherein the valve stem is pulled from the valve using an actuator connected to the valve.

6. The method of claim 1, further including the step of removing a bonnet assembly of the valve to expose the valve stem prior to the securing step.

7. A method of removing valve packing from a valve having a valve stem terminating in a valve plug, the method comprising the steps of:
    locating the valve stem;
    securing a sleeve to the valve stem at a location between the valve plug and the packing;
    relieving pressure from the packing; and
    causing the sleeve to apply a removing force to the packing by pulling the valve stem away form the valve.

8. The method of claim 7, including the step of supplying the sleeve in two pieces, and securing the pieces to one another adjacent the valve stem using a fastener.

9. The method of claim 7, including the step of securing the sleeve in place using a snap ring.

10. The method of claim 7, wherein the packing is compressed around the valve stern by a spring and an end cap secured to the valve, the pressure is relived from the packing by removing an end cap from the valve.

11. The method of claim 7, including the step of using a valve actuator to apply the removing force.

12. The method of claim 7, including the step of exposing a portion of the valve stem by removing a bonnet assembly.

* * * * *

UNITED STATES PATENT AND TRADEMARK OFFICE
CERTIFICATE OF CORRECTION

PATENT NO. : 7,472,716 B2  Page 1 of 1
APPLICATION NO. : 11/671808
DATED : January 6, 2009
INVENTOR(S) : Douglas P. Gethmann It is certified that error appears in the above-identified patent and that said Letters Patent is hereby corrected as shown below:

In the Specification:

At Column 2, line 11, "interior" should be -- interior. --.

In the Claims:

At Column 5, line 26, "stern" should be -- stem --.

At Column 6, line 23, "stern" should be -- stem --.

At Column 6, line 24, "relived" should be -- relieved --.

Signed and Sealed this

Fifteenth Day of September, 2009

David J. Kappos
*Director of the United States Patent and Trademark Office*